(12) United States Patent
Krizmanic et al.

(10) Patent No.: US 8,327,609 B2
(45) Date of Patent: Dec. 11, 2012

(54) AUTOMATED SYSTEM FOR PREPARING PARCELS

(75) Inventors: Renato Krizmanic, Chevigny-Saint-Sauveur (FR); Joel Foulon, Combertault (FR); Stephane Pietrowicz, Fixin (FR); Jean-David Attal, Dijon (FR); Bernard Piette, Dijon (FR)

(73) Assignee: Savoye, Dijon (FR)

( * ) Notice: Subject to any disclaimer, the term of this patent is extended or adjusted under 35 U.S.C. 154(b) by 491 days.

(21) Appl. No.: 12/599,880

(22) PCT Filed: May 9, 2008

(86) PCT No.: PCT/FR2008/000651
§ 371 (c)(1),
(2), (4) Date: Nov. 12, 2009

(87) PCT Pub. No.: WO2008/152244
PCT Pub. Date: Dec. 18, 2008

(65) Prior Publication Data
US 2010/0300048 A1    Dec. 2, 2010

(30) Foreign Application Priority Data
May 11, 2007    (FR) .................................... 07 03392

(51) Int. Cl.
*B65B 5/00*    (2006.01)
*B65B 3/04*    (2006.01)
(52) U.S. Cl. .......................................... 53/473; 414/266
(58) Field of Classification Search .................... 53/473;
414/266–286
See application file for complete search history.

(56) References Cited

U.S. PATENT DOCUMENTS

| 5,379,229 | A  | * | 1/1995 | Parsons et al. | 700/215 |
| 6,061,607 | A  | * | 5/2000 | Bradley et al. | 700/216 |
| 7,261,509 | B2 |   | 8/2007 | Freudelsperger |  |
| 7,963,384 | B2 | * | 6/2011 | Lafontaine | 198/349 |
| 7,991,506 | B2 | * | 8/2011 | Schafer | 700/216 |
| 2004/0052619 | A1 | * | 3/2004 | Guidetti | 414/266 |
| 2004/0197171 | A1 | * | 10/2004 | Freudelsperger | 414/281 |
| 2005/0232732 | A1 | * | 10/2005 | Philipp | 414/331.09 |
| 2006/0045673 | A1 | * | 3/2006 | Yoshitani | 414/276 |
| 2006/0045727 | A1 | * | 3/2006 | Jungbluth | 414/800 |

(Continued)

FOREIGN PATENT DOCUMENTS
DE    20112328 U1    1/2002
(Continued)

OTHER PUBLICATIONS
International Search Report of PCT/FR2008/000651; Dec. 1, 2008; Marc Schneider.
(Continued)

*Primary Examiner* — Lindsay Low
(74) *Attorney, Agent, or Firm* — BCF LLP

(57) ABSTRACT

An automated system for preparing parcels of products has a storage assembly housing product containers; a pick station; a main conveyor which conveys the product container between the inlet/outlet of the storage assembly and the pick station; and a central management computer system which manages the product order list associated with each parcel. The main conveyor arranges the containers according to an order list, using a first conveyor belt section, a second conveyor belt section adjacent to the pick station and a buffer zone between the outlet of the storage assembly and the first belt section. The containers are moved between the belt sections by transfer members in transfer zones.

5 Claims, 2 Drawing Sheets

U.S. PATENT DOCUMENTS

| | | | | |
|---|---|---|---|---|
| 2009/0129902 A1* | 5/2009 | Schafer | | 414/274 |
| 2009/0136328 A1* | 5/2009 | Schafer | | 414/273 |
| 2009/0324378 A1* | 12/2009 | Schafer | | 414/795.9 |
| 2010/0322746 A1* | 12/2010 | Lert et al. | | 414/273 |
| 2011/0262253 A1* | 10/2011 | Krizmanic et al. | | 414/279 |

FOREIGN PATENT DOCUMENTS

| | | |
|---|---|---|
| DE | 20211321 U1 | 1/2003 |
| EP | 1760012 A1 | 3/2007 |
| EP | 1767472 A1 | 3/2007 |
| JP | 63160906 A | 7/1988 |
| JP | 2004284759 A | 10/2004 |

OTHER PUBLICATIONS

English Abstract of JP2004284759; Published on Oct. 14, 2004.
English Abstract of JP63160906; Published on Jul. 4, 1988.
English Abstract of EP1767472; Published on Mar. 28, 2007.
English Abstract of EP1760012; Published on Mar. 7, 2007.

* cited by examiner

US 8,327,609 B2

AUTOMATED SYSTEM FOR PREPARING PARCELS

CROSS-REFERENCES

The present application is a national stage entry of International Application Number PCT/FR2008/000651, filed May 9, 2008 which claims priority to French Patent Application No. 0703392, filed May 11, 2007, the entirety of both of which is incorporated herein by reference.

FIELD OF THE INVENTION

The present invention concerns an automated system for preparing product order parcels, in particular for preparing unit orders, and a method of preparing parcels using said system.

BACKGROUND OF THE INVENTION

These parcel preparation systems are more particularly used in distance selling and despatch companies for small-volume products. The main examples of users of these automated parcel preparation systems are the suppliers of office equipment, clothing, cosmetic products, tools or spare parts in the engineering industry. These systems make it possible to prepare, with a minimum amount of labour, in a short time and with precise stock control, a parcel corresponding to a precise order from a customer, said order relating to several products in different quantities, each of the products with its quantity being identified by an order line.

The known automated parcel preparation systems are generally composed of an automated storage magazine enclosing the products in containers, a picking station where the products are taken and placed in a parcel, a conveyor bringing the products from the magazine to the picking station and vice versa and a central management computer system.

In unit order preparation systems, each container is associated with a unique product reference.

An automated storage magazine comprises a plurality of superimposed storage levels in which transfer devices move products, for placing them within storage zones and for taking them from these zones.

A first known example of an automated parcel preparation system thus uses a magazine of the horizontal carousel type. The drawback of this system is linking the product flow and the storage capacity. In addition, it is not possible to resupply the carousel while it is being used for preparing parcels.

Another known magazine technology is that in which the transfer device is formed by the association of at least one transfer shuttle and an elevator. The storage magazine then comprises storage assemblies, each storage assembly being formed by a lane serving on either side storage racks with several levels, said racks being subdivided over their section into storage cells each intended to accept a product container, this lane receiving, at each storage level, tracks for the movement of a shuttle and an elevator being disposed at least one of the ends of the lane. A track is generally formed by parallel rails and the shuttle is equipped with wheels to move on these rails. The shuttles can therefore move horizontally at a given level, but also be brought from one level to another by elevators according to the possibilities provided by the manufacturer of the magazine.

Thus an example of a parcel preparation system is known based on a shuttle and elevator solution, in which each storage level comprises a shuttle that deposits the containers, which are specific containers disposed or not on trays, in the elevators. In this system, the shuttles are supplied by conductive rails. This solution is not optimum, in particular from the point of view of the occupation of the shuttles and the total cost of the installation because of the required quantities of conductive rails and risks of immobilisation of the shuttle in the event of an object on the rails giving rise to poor electrical contact between the rail and the shuttle.

According to another example based on this same technology, the shuttles are also supplied by a conductive rail but can use the elevators to pass from one level to another and thus travel on the conveyor.

In the last two examples, these systems require the prior transfer of the products in containers specific to the system.

Other examples of the design of parcel preparation systems based on magazine solutions with shuttles and elevator are given in the documents DE 202 11 321 U and DE 201 12 328 U.

The first proposes a system in which the racks in the magazine are subdivided into self-contained sub-sectors, each sub-sector comprising an elevator associated with a shuttle and a buffer area for loading/unloading containers from or to horizontal conveyors bringing the containers to the picking stations. In DE 201 12 328 U, the sequencing of the containers takes place at the storage magazine, the products being removed in the order of the order list and directed to the picking stations when they leave the magazine by a complex distribution system based on conveyors with circulation loops intersecting on different levels.

These known parcel preparation systems therefore have various drawbacks related to their manufacturing, operating and maintenance costs, to the time necessary for preparing a parcel, and to the complexity of the management of the movements of the various components.

SUMMARY OF THE INVENTION

The present invention therefore aims to remedy these drawbacks by proposing an original solution of an automated system for preparing product order parcels that is expandable, where the storage capacity is dissociated from the product flow, in which management of the movements of the various elements are simplified and where the production and operating costs are economically advantageous.

In this regard, the system according to the invention comprises:
 a storage magazine comprising at least one storage assembly, each storage assembly being formed by a lane serving on either side storage racks with several levels, said racks being subdivided over their length into storage compartments intended each to accept a product container, this lane receiving, at each storage level, tracks for the movement of a shuttle allowing the placing or extraction of said containers inside the compartments and an elevator being disposed at least one of the ends of the lane, the elevator being able to bring a shuttle from one level to another and comprising an input and/or output level of the magazine for the product containers,
 a picking station where an operator prepares the parcel by placing therein the desired quantity of products,
 a main conveyor assembly bringing the container of products from the input/output of the magazine to the picking station and vice versa,
 a central management computer system controlling the movements of each parcel, each shuttle, each elevator and each product container and managing the product order list associated with each parcel, said list consisting of order lines each indicating the desired product and quantity, the main conveyor assembly comprising means of sequencing the product containers according to their order on the order list, so that they are presented to the picking station in this order.

This system is remarkable in that the sequencing means comprise a first conveying section, referred to as the input/output section, a second conveying section, referred to as the accumulation section, parallel and adjacent to the first conveying section and adjacent to the picking station, the said conveying sections being located horizontally at the same level, and an intermediate buffer zone located between the output of the magazine and the first conveying section, the product containers being transposed between the conveying sections at the transfer zones by transfer members and the direction of movement of the two conveying sections being opposite, so that the circulation of the product containers between the input/outputs of the magazine and the picking station takes place in a loop.

It will be understood clearly that this automated system affords greater freedom in the management of the movements of the shuttles and elevators since the final sequencing is provided outside the magazine. In addition and advantageously, this system simplifies the preparation of the parcels by the operator since the various product containers are presented to him in a given order and coinciding with the successive arrivals of parcels to be prepared at the picking station.

Other advantages and characteristics will emerge more clearly from the following description of a variant execution, given by way of non-limitative example, of the automated parcel preparation system, with reference to the accompanying figures, in which.

DETAILED DESCRIPTION OF PREFERRED EMBODIMENTS

Figure 1:
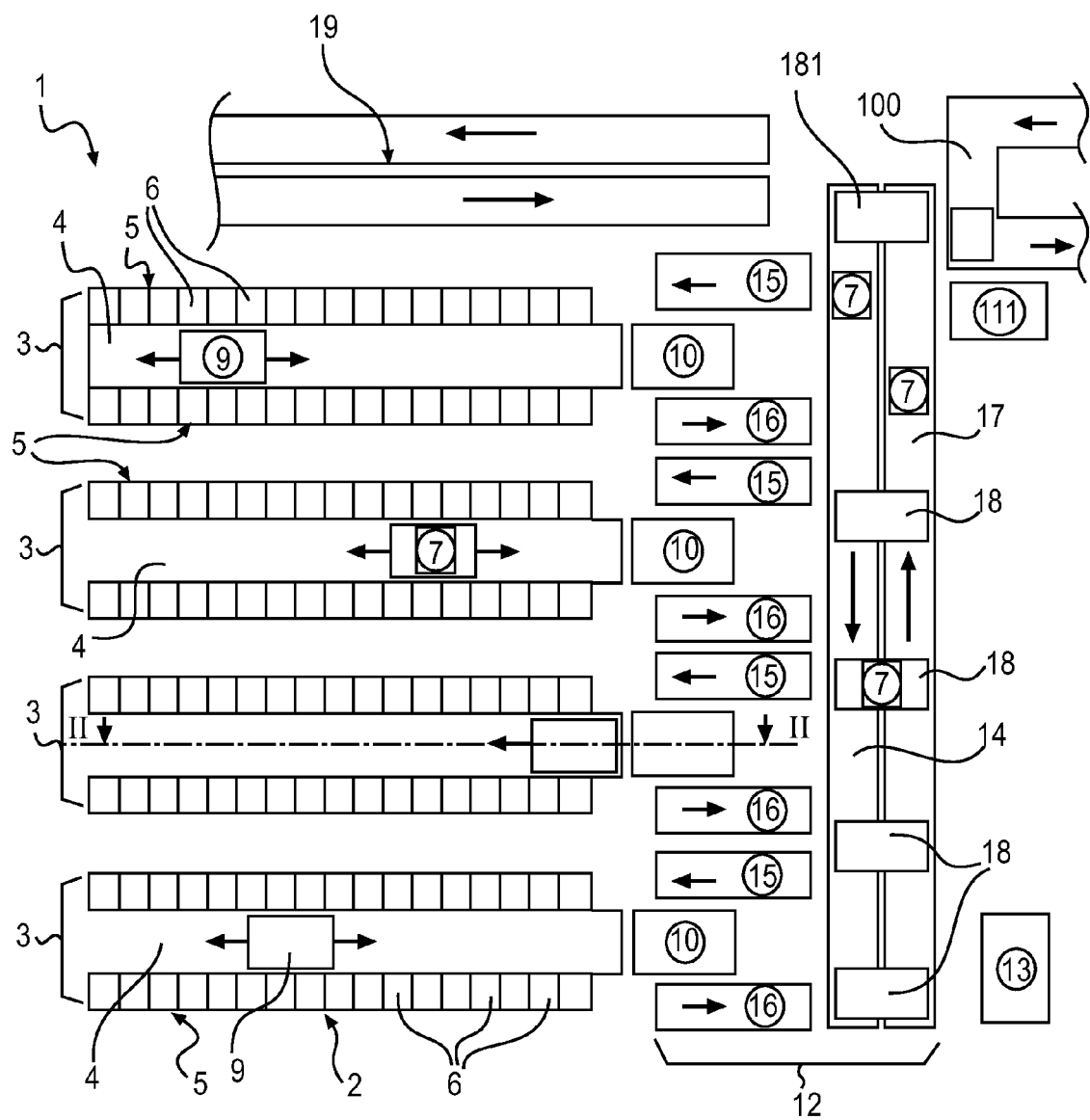
FIG. 1 is a plan view of a schematic representation of the automated system according to the invention.
Figure 2:
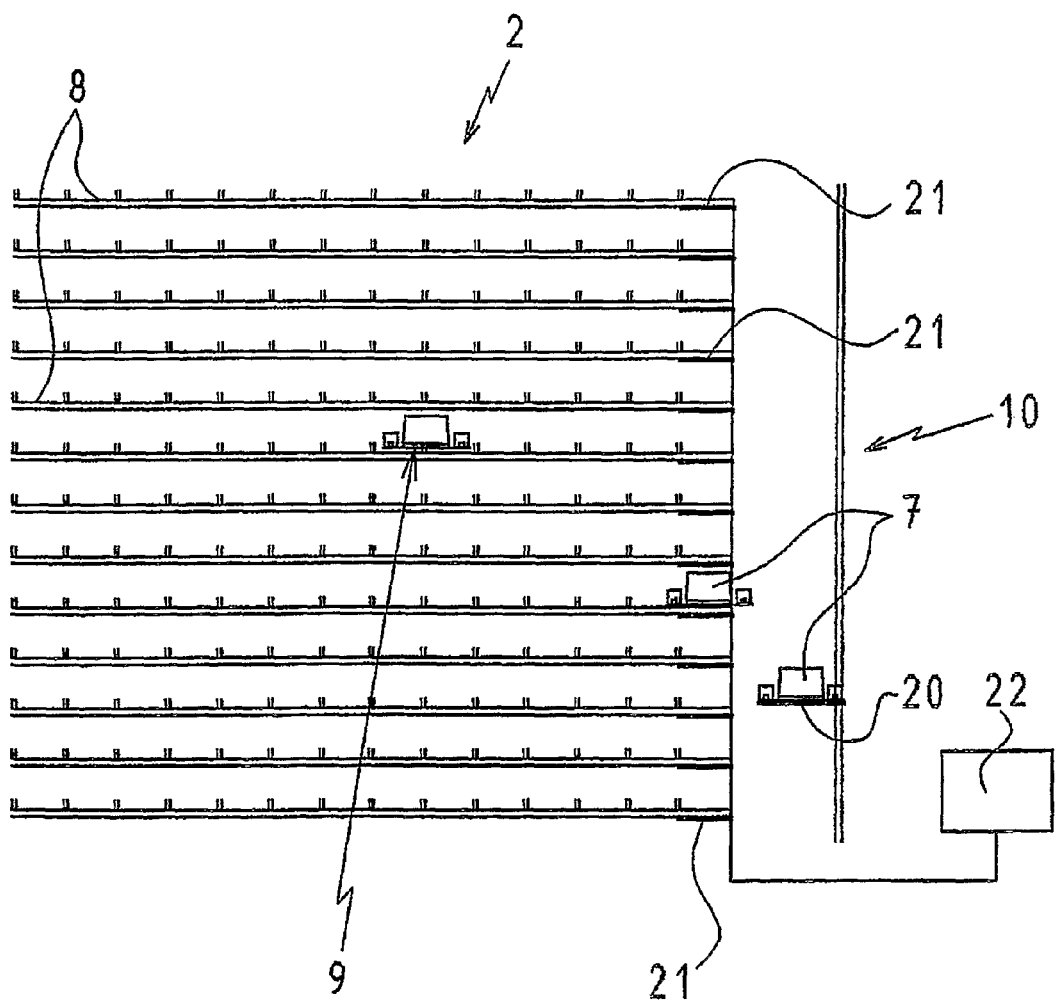
FIG. 2 is a partial view in section along the axis II-II' of FIG. 1 of the storage magazine forming part of the system according to the invention.

With reference to FIGS. 1 and 2, the automated system 1 for preparing parcels 100 comprises a storage magazine 2 shown here in a configuration with four storage assemblies 3. Each of the storage assemblies 3 is formed by a lane 4 serving on either side storage racks 5 with several levels, said racks 5 being subdivided over their length into storage cubicles 6 intended each to accept a product container 7.

At each level, the lane 4 receives a track 8 comprising two parallel rails for the movement of a transfer shuttle 9. With each storage assembly 3 there is associated an elevator 10, disposed at the same end of the lane 4 for transporting a shuttle 9 from one level to another level and comprising an input and/or output level of the magazine 2 for the product containers 7. The input and output of the containers 7 can take place at the same level or at different levels, according to the configuration of the automated system 1.

The automated system 1 according to the invention also comprises a picking station 11, a main conveyor assembly 12 and a central management computer system 13.

It is at the picking station 11 that an operator prepares a parcel 100 by placing therein the desired quantity of products, determined by the order list associated with the parcel. The picking station for this purpose comprises visual or audible signalling means, for example a screen, indicating to the operator the quantity of product to be taken from the container 7 present at the picking station 11. The advantage afforded by this automated system 1, which simplifies the task of the operator and affords a saving in time in preparing the parcel, can easily be seen.

The main conveyor assembly 12 brings the containers 7 of products from the input/output of the magazine 2 to the picking station 11 and vice versa.

The central management computer system 13 controls the movement of each parcel 100, each shuttle 9, each elevator 10 and each product container 7. The central management computer system 13 also manages the order list associated with each parcel 100 and therefore the order of the order lines according to the storage location of the product containers 7, the availability of the shuttles and elevators and the product requirements of the various parcels 100 to be prepared, which follow each other at the picking station 11, in order to optimise all the movements and preparation times for the parcels 100 and to ensure synchronisation between the arrival of a parcel 100 being prepared and the corresponding product containers at the picking station 11. Naturally this central management computer system 13 can be subdivided into several units and hierarchical layers communicating with one another, according to the architectures known to persons skilled in the art.

According to an essential feature of the invention, the main conveyor assembly 12 comprises means for sequencing the product containers 7 according to their order on the order list, so that they are presented in this order at the picking station 11.

With reference to FIG. 1, the sequencing means comprise an intermediate buffer zone located between the outputs of the magazine 2 and a first conveying section 14, referred to as the input/output section.

According to the variant embodiment of the invention shown in FIG. 1, the intermediate buffer zone consists of pairs of intermediate conveyors respectively input 15 and output 16, disposed on each side of each of the elevators 10 and transversely with respect to the input/output section 14.

The sequencing means also comprise a second conveying section 17, referred to as the accumulation section, parallel and adjacent to the first section 14 and adjacent to the picking station 11. Preferably the two conveying sections 14, 17 are located horizontally at the same level. The product containers 7 are transposed between the conveying sections 14, 17 at the transfer zones 18 by transfer members and the direction of travel of the two conveying sections 14, 17 is opposite, so that the circulation of the containers of products between the inputs/outputs of the magazine 2 and the picking station 11 takes place in a loop, in one direction or the other. With reference to FIG. 1, the direction of circulation shown of the containers 7 on the conveying sections 14, 17 takes place here in the anti-clockwise direction. In addition, the conveying of the containers 7 will preferably be effected in steps, a step being slightly longer than the predefined maximum length of the containers 7.

The transfer of the containers 7 at the input/output of an elevator 10, from a shuttle 9 towards the intermediate output conveyor 16 or conversely from the intermediate input conveyor 15 to a shuttle 9, is accompanied by a mechanical device, also supervised by the central computing system 13. This device is necessary in order to release the container 7 from the shuttle 9 or bring it closer to it so that the vertical movement of the elevator 10 is effected in complete safety and without any interference that could cause a problem of loading or unloading of a container 7 on or from said shuttle 9. The conveying on the intermediate conveyors 15, 16 can be carried out by means of free rollers, being able to be driven as required by drive rollers, via the use of belts between two rollers, step by step.

The mechanisms for transferring containers 7 between the input/output section 14 and the intermediate conveyors 15, 16 are of types well known to persons skilled in the art.

According to a preferred variant embodiment, the conveying sections 14, 17 are formed by free rollers with a horizontal axis able to be driven as required in rotation, for example by the friction of a friction belt, said belt being disengageable, or by drive rollers, via the use of belts between two rollers in steps. The rollers of the conveying section may be braked. Naturally a person skilled in the art will be able to use any other known conveying system, such as single-belt, multi-belt or modular-belt systems, without departing from the scope of the present invention.

With reference to FIG. 1, the main conveyor assembly 12 comprises, at least at each of its ends, a transfer zone 18. Preferably and advantageously, it will comprise several transfer zones 18, at least one per storage assembly 3 except for the assembly that is located just facing the picking station 11 in order to prevent congestion of containers 7 at the picking station 11. In these transfer zones 18 transfer members operate, transposing the product container 7 from one section to another. Ideally, each transfer zone will be located on the location of a step on each of the input/output sections 14 and accumulation sections 17.

According to a preferred variant embodiment of the invention, the conveying sections 14, 17 are located horizontally at the same level and the transfer members are formed by transfer tables provided with belts for driving the containers, on an axis perpendicular to the direction of travel on the conveying sections 14, 17, said belts being disposed between rollers of the conveying sections 14, 17 and being able to be put in contact as required with the bottom face of the product containers 7 in order to transpose them or not from one section to another. It goes without saying that the nature of the transfer members is in no case limitative of the invention and that a person skilled in the art will be able to use other mechanical systems performing the same functions, such as for example pusher or clamp systems.

Preferably, as shown in FIG. 1, the picking station 11 will be positioned along the accumulation section 17 so that the picking operation is carried out not on the last step of the accumulation section of the main conveyor where the transfer zone 181 is located between the accumulation section and the input/output section, but on the previous step, for the purpose of optimising the transfer time. This is because, a rectilinear transfer being more rapid than a transverse transfer from one section to another, the transverse transfer is then advantageously performed during the picking time in the following container.

With reference to FIG. 1, the system 1 according to the invention also comprises a related conveyor 19 for the restocking of the magazine 2 and the discharge of the empty or possibly faulty containers 7. This related conveyor 19 can be placed at the upstream end of the input/output conveying section 14, downstream of the picking station 11. Naturally the system could be restocked by other means, for example by providing an elevator at the other end of the lanes, which elevator would be in connection with a restocking conveyor.

According to another advantageous feature of the invention, the product container 7 is disposed on a plate. This plate comprises means of cooperating with the gripping system of the shuttle 9 and with the mechanical transfer device between said shuttle 9 and the intermediate conveyors 15, 16 at the input and/or output level of the elevators 10.

A detailed example embodiment of said cooperation means and of the shuttle gripping system is described in another patent application filed concomitantly in the name of the applicant and which relates specifically to this aspect.

The length of the movement steps on the conveying sections will therefore be slightly longer than the length of a plate.

The plate also comprises means of stabilising the container adaptable to different container dimensions. Thus the system according to the invention can accept equally well product containers consisting of a packaging carton, that is to say the carton for bulk or ordered packaging of products as supplied by their manufacturer or distributor, a standard container available commercially or a dedicated container, that is to say the shapes and dimensions of which have been specifically designed for use in an automated magazine, in which containers the products have been transferred. In the case where the products are packaged in their packaging carton, the time and labour costs of a transfer step in dedicated containers are advantageously saved on.

Naturally, the automated system according to the invention can also be used without a plate, with dedicated containers, the bottom of which repeats the particular features of the bottom of the plate in order to cooperate with the particular gripping system of the shuttle.

According to another feature of the invention, the shuttle is of the self-contained type with onboard means of supplying energy to the propulsion means. According to a particular preferred variant embodiment, the power supply means of the shuttle are of the electrical type and they comprise an electrical energy storage means of the electrostatic type. In particular and advantageously, the storage means comprises a battery of supercapacitors. In this preferred variant, as shown in FIG. 2, the elevators 10 and the ends of the tracks 8 in the vicinity of said elevators comprise conductive track sections, respectively 20 and 21, provided in the shuttle recharging zone; these track sections 20, 21 are connected to a common electrical supply 22 per lane 4.

It will be easy to understand the significant economic advantage of this technological choice, reducing to a minimum the necessary lengths of conductive rails for recharging the supply to the shuttles compared with shuttles directly supplied by conductive rail, and the increased simplicity and reliability of the operating mode of said shuttles compared with a battery supply system. The details of the design of the shuttle supplied by electrostatic storage is the subject of another patent application filed concomitantly in the name of the applicant, to which reference will advantageously be made for a detailed description of the features particular to this shuttle according to the preferred variant embodiment of the present invention.

Another object of the invention is a parcel preparation method using the system described above.

This method comprises a first step of loading, onto a shuttle 9 for transferring the container 7, of products corresponding to a given order line, followed by a step of moving the loaded shuttle 9 on the tracks 8 of the lane 4 of the storage assembly 3 in which it is moving, the shuttle 9 then being brought by the elevator to the lower input/output level of the storage magazine 2. Then there follow a step of transferring the container from the shuttle 9 to the intermediate buffer zone, a step of sequencing the various containers 7 on the section of the accumulation conveyor 17, and a step of the picking by an operator of the product in the container 7 according to the required quantity and the packaging of said products. Finally, the method comprises a step of returning the container 7 to the storage magazine 2.

According to a first variant, the sequencing step on the accumulation section 17 consists of keeping the container p of a given order line in the intermediate buffer zone until the container p-1 of the previous order line is located downstream on the circulation loop of the input/output section 14 and the accumulation section 17, then transferring the container p onto the input/output section 14 and moving it on said section as far as the first transfer zone 18 where the container p-1 is located downstream of said zone, and then transposing the container p from the input/output section 14 to the accumulation section 17 so that the containers p-1 and p follow each other at the picking station 11.

According to another variant execution, the sequencing step on the accumulation section 17 consists of keeping the container p of a given order line in the intermediate buffer zone until the container p-1 of the previous order line is located on the accumulation section 17, other than at its end furthest away from the picking station 11, and until the path as far as the next transfer zone 18 is free, and then transferring the container p onto the input/output section 14 and moving it onto said section as far as the first transfer zone 18 where the container p-1 is located downstream of said zone, and then transposing the container p from the input/output section 14 to the accumulation section 17 so that the containers p-1 and p follow each other at the picking station 11.

Naturally the two variants of the method described above are given by way of non-limitative example and a person skilled in the art will for this sequencing step be able to design other methods of managing the movements of the parcels on the main conveyor assembly 12 according to the invention.

The operating principle of the system will now be described. As soon as a new order list is triggered by the central computing system 13 with a view to the arrival of a parcel 100 to be prepared at the picking station, task instructions are transmitted to the shuttles 9 which, in parallel, each come to take from the compartments 6 a container 7 corresponding to the first order lines. The loaded shuttles 9 then return to the elevators 10, which will, according to their availability and their order of priority, each take charge of the shuttles 9. The management of the waiting cycles of the elevator 10 is provided by the central computing system 13, which also takes account of the electrical charge level of each of the shuttles 9.

At the exit level of the elevators 10, the shuttle 9 performs its task, that is to say it deposits the container 7 on the intermediate discharge conveyor 16. Then the elevator 10 brings the shuttle 9, empty or loaded with a return container from the picking station and which was waiting on the intermediate input conveyor 15 close to the elevator 10, to a level where it will take a new container 7 after having deposited, in an available storage compartment 6, the container 7 to be stored, as applicable.

The containers 7 deposited on the intermediate output conveyors 16 are progressively transferred onto the input/output section 14 and the accumulation section of the main conveyor assembly 12 according to the sequencing principle of the method described above, so that the containers 7 are presented in the order of the order lines at the picking station 11. In addition, the central computing systems synchronises the arrival at the picking station of the first containers of an order with the arrival of the parcel to be prepared. At this station, the operator picks the required quantity of products and places them in the parcel 100 being prepared. Next the container 7 returns to the input/output section 14 and then to the intermediate input conveyors 15 of the magazine and waits to be taken up by a shuttle 9, which comes to perform its previous loading task.

After passing to the picking station 11, if a container 7 is emptied of its content or the quantity of products that it contains has reached a predefined renewal threshold, it will be directed to the related conveyor 19, which will discharge it from the system 1 and will introduce into the system a new container filled with the relevant products.

Naturally each container or support plate for these containers will comprise identification means of the bar code or RFID label type enabling the central management system to precisely locate each of the containers. Readers for these identification means will be disposed on the conveyors at the transfer intersections and just upstream of the picking station and will optionally be able to equip the transfer shuttles.

It should be noted that the number of shuttles per lane may be chosen freely between 1 and n, where n is the number of levels of storage racks in the lane 4, according to the application envisaged, and in particular parameters such as the rate of stock rotation, the maximum access time required for an object, the cost of the installation, etc.

Preferably, in order to optimise the occupation level of the shuttles and the total cost of the installation, a number of shuttles per lane between one and five will be chosen, preferably between one and three, for racks comprising eight to fifteen levels.

It will be understood clearly that, in general terms, the storage magazine of the automated system according to the invention may comprise only one lane and that only one or two storage racks are associated with each lane, without for all that departing from the scope of the present invention.

Finally, it goes without saying that the examples that have just been given are therefore only particular illustrations, in no way limitative, of the fields of application of the invention.

The invention claimed is:

1. Automated system for preparing product parcels, comprising:
    a storage magazine comprising at least one storage assembly, each storage assembly being formed by a lane serving on either side storage racks with several levels, said racks being subdivided over their length into storage compartments intended each to accept a product container, this lane receiving, at each storage level, tracks for the movement of a shuttle allowing the placing or extraction of said containers inside the compartments and an elevator being disposed at at least one of the ends of the lane, the elevator being able to bring a shuttle from one level to another and comprising an input and/or output level of the magazine for the product containers,
    a picking station where an operator prepares the parcel by placing therein the desired quantity of products,
    a main conveyor assembly bringing the container of products from the input/output of the magazine to the picking station and vice versa,
    a central management computer system controlling the movements of each parcel, each shuttle, each elevator and each product container and managing a product order list associated with each parcel, said list consisting of order lines each indicating the desired product and quantity,
    the main conveyor assembly comprising means for sequencing, the means for sequencing permitting to sequence the product containers according to their order on the order list, so that they are presented to the picking station in this order, wherein the means for sequencing comprise a first conveying section, referred to as the input/output section, a second conveying section, referred to as the accumulation section, parallel and adjacent to the first conveying section and adjacent to the picking station, the said conveying sections being located horizontally at the same level, and an intermediate buffer zone located between the output of the magazine and the first conveying section, the product containers being transposed between the conveying sections at transfer zones and the direction of movement of the two sections being opposite, so that the circulation of the product containers between the input/outputs of the magazine and the picking station takes place in a loop.

2. An automated system according to claim 1, wherein the intermediate buffer zone consists of pairs of intermediate conveyors, respectively intermediate input conveyor and intermediate output conveyor, disposed on either side of each of the elevators at their input and/or output level of the magazine and transversely with respect to the input/output section of the main conveyor assembly.

3. An automated system according to claim 1, wherein the product container is taken from: a packaging carton, a standard commercially available box or a dedicated box into which the products have been transferred.

4. An automated system according to claim 1, wherein the shuttle is of the self-contained type with onboard means for supplying, the means for supplying providing an electrical supply to shuttle propulsion means, said means for supplying comprising means for storing, the means for storing permitting storage of electrical energy of the electrostatic type, the elevators and the ends of the tracks in the vicinity of said elevators comprising a recharging zone for recharging the shuttles.

5. Method of preparing parcels according to a product order list consisting of order lines each indicating the product and the required quantity of said product using the system according to claim 1, said method comprising a first step of loading onto a transfer shuttle the product container corresponding to a given order line, followed by a step of moving the loaded shuttle on the tracks of the lane of the storage assembly in which it is located, the shuttle then being brought by the elevator as far as the output level of the storage magazine, then a step of transferring the container from the shuttle to the intermediate buffer zone, a step of sequencing the various containers on the accumulation section, a step of the picking by an operator of the products in the container according to the required quantity and the packaging of said products and finally a step of return of the container to the storage magazine, wherein the sequencing step on the accumulation section consists of:

keeping the container p of a given order line in the intermediate buffer zone until one of:
the container p-1 of the previous order line is located downstream on the circulation loop of the input/output section and accumulation section, and
the container p-1 of the previous order line is located on the accumulation section, other than at an end of the accumulation section furthest away from the picking station, and until a path as far as a next transfer zone is free,
then transferring the container p onto the input/output section and moving it on said section as far as a first transfer zone where the container p-1 is located downstream of said zone, then transposing the container p from the input/output section to the accumulation section so that the containers p-1 and p follow each other at the picking station.

* * * * *